United States Patent [19]

Proctor et al.

[11] Patent Number: 5,303,232

[45] Date of Patent: * Apr. 12, 1994

[54] HIGH PERFORMANCE ASYNCHRONOUS TRANSFER MODE SWITCH

[75] Inventors: Richard J. Proctor; Thomas S. Maddern, both of Wimborne; Mark T. Jeffrey, Wareham; Alexander Philip, Wimborne, all of England

[73] Assignee: GPT Limited, England

[*] Notice: The portion of the term of this patent subsequent to Apr. 28, 2009 has been disclaimed.

[21] Appl. No.: 679,768

[22] Filed: Apr. 3, 1991

[30] Foreign Application Priority Data

May 25, 1990 [GB] United Kingdom ............... 9011743

[51] Int. Cl.⁵ ............................................. H04Q 11/04
[52] U.S. Cl. ........................................ 370/60; 370/54; 370/61
[58] Field of Search ................. 370/60, 94.1, 54, 61, 370/60.1, 58.1-58.3

[56] References Cited

U.S. PATENT DOCUMENTS

| | | | |
|---|---|---|---|
| 4,864,558 | 9/1989 | Imagawa et al. | 370/60 |
| 5,038,343 | 8/1991 | Lebizay et al. | 370/60 |
| 5,050,166 | 9/1991 | Cantoni et al. | 370/94.1 |
| 5,109,378 | 4/1992 | Proctor et al. | 370/58.1 |

*Primary Examiner*—Douglas W. Olms
*Assistant Examiner*—Chau T. Nguyen
*Attorney, Agent, or Firm*—Kirschstein, Ottinger, Israel & Schiffmiller

[57] ABSTRACT

The invention concerns an Asynchronous Transfer Mode Switch having a plurality of input stages (IS1 ... 1SN) each for receiving a digital data transmission stream (DS1 ... 256) consisting of a series of cells and wherein each input stage of the switch includes a circuit (52) for determining the destination of the cells of that data stream, and a circuit (63) for disassembling each cell into cell elements and for allocating to each cell element routing data to enable it to be routed across the central stages.

4 Claims, 7 Drawing Sheets

Fig. 5. OVERLAPPING SUB-CELL WINDOWS

THIS SHOWS OVERLAPPING WINDOWS ON A PATH FROM AN INPUT SWITCH TO A CENTRAL SWITCH

Fig. 6. SUB CELL FORMATS

INPUT TO CENTRAL A

| REQUESTS (20) | | | LAST DATA/NEXT REQUEST | DATA (44 bits) | |
|---|---|---|---|---|---|
| AD1 (8) | AD2 (8) | ST (4) | GAP FOR LAST DATA AND NEXT REQUESTS (64) | PART (4) | 5.OCTETS OF DATA (40 bits) |

CENTRAL TO OUTPUT B

| SINGLE WINDOW OF 64 bits | | | | 118 | 119 |
|---|---|---|---|---|---|
| Adr (8) | Ans (2) | Part (4) | 5 OCTETS OF DATA (40 bits) | SPARE (10) | |

AD1 = DEST ADDRESS 1  
AD2 = DEST ADDRESS 2  
Adr = WHERE THE PART CAME FROM  
ST = STATUS OF ADDRESSES  
Part = PART NUMBER OF CELL  
Ans = ANSWER TO QUESTIONS

HIGH PERFORMANCE ASYNCHRONOUS TRANSFER MODE SWITCH

BACKGROUND OF THE INVENTION

Field of the Invention

The present invention concerns switches for switching digital data and is particularly, though not exclusively, concerned with Asynchronous Transfer Mode Switches. Such switches will hereinafter be erred to as ATM switches.

Description of Related Art

ATM switches are used in digital data transmission systems to receive multiplexed data streams and to distribute the incoming data streams to requisite output ports. Frequently ATM switches are used for carrying out packet switching. In a packet switching system each incoming data stream consists of a sequence of what are known as cells, each cell for example consisting of 48 bytes of data and a header containing control data from which the destination of the cell can be determined. Typically for a 48 byte cell the headers will be 5 bytes long. However, neither the cell nor the header length are of fundamental importance to the basic principles of the operation of ATM switches.

As the rate of data transmission and the volume of digital traffic to be handled by digital transmission systems is continually increasing the problems of switching data streams becomes increasingly complex.

The basic functions of known ATM switches can be broken down into three main components:

Firstly the switch comprises a header decoder unit on each port which translates the incoming circuit indentity into an outgoing circuit indentity and port number. This unit is also able to police the utilisation of a particular circuit against its negotiated traffic level limits and where necessary discard cells in order to avoid overloading the switch which could impact on other traffice being carried.

The second function is to transfer data elements from the incoming ports to the outgoing ports according to the physical port routing information derived by the header decoder unit. This is essentially a spatial routing function.

The third function is to statistically multiplex the data elements transferred across the routing function onto the designated outgoing port traffic stream. Due to the peaks in traffic which exceed the capacity of the outgoing stream it will be necessary to queue some of the data elements. This outgoing multiplexing and queuing function may be likened to the operation of a time switch in synchronous circuit switching but does not obey a predefined cyclic allocation of virtual circuits in the time domain.

Existing designs of switches implement the routing and queuing functions in a number of different ways. Thus the routing function may either be implemented by a spatial routing network similar to that of circuit switch network, or use may be made of the time domain on buses or rings. However for large switches the single point interchange media of a time multiplexed bus soon exceeds practical bandwith limits.

The queuing function may also be implemented in several ways. The most direct method is to have a dedicated FIFO type store for each output port. In practice the spatial routing function and the output queuing element cannot cope with simultaneous transfers from a large number of input ports and the output queue is reflected back onto the input ports. It is also possible to queue within the spatial routing function, particularly where it is making use of the time domain to achieve its switching operation.

Unless the routing function is able to simultaneously carry the full load of the switch to one output, then some form of contention resolving mechanism is required or intermediate queues have to be provided. Generally ATM switches only permit virtual circuits to be routed one way internally in order to maintain sequence integrity of the cells. Similarly at the network level there is a fixed routing of cells.

SUMMARY OF THE INVENTION

The present invention is concerned with providing a data switch which is capable of handling a substantial number of input data streams and yet which uses currently available technology.

Accordingly the present invention comprises an Asynchronous Transfer Mode Switch having a plurality of input stages each for receiving a digital data transmission stream consisting of a series of cells, a cell comprising data and a header containing control data from which the destination of the cell can be determined, a plurality of central stages connected to the input stages to receive the data from the input stages to be switched across the switch, each central stage including a central switch, and a plurality of output stages each connected to the central stages, and wherein for every input stage there is a route to every central stage for the transmission of data, and from every central stage there is a route to every output stage, and wherein each input stage includes a circuit for determining the destination of the cells of that data stream, a circuit for disassembling each cell into cell elements and for allocating to each cell element routing data to enable it to be routed across the central stages, means for storing the cell elements sequentially, means for requesting from a central stage, in response to receipt of a cell within the input stage, permission to transmit a cell element in the series and after a predetermined delay a further request for the same destination point provided that the stored cell elements are derived from the same cell, means for receiving a response from the central stage as to the availability of the requested destination between the sending of requests so that the sequence of sending a request for one cell element is interleaved with the response to the request for the preceding cell element, and means for transmitting each cell element to the central stage after a second predetermined delay from the receipt of a positive response therefrom.

BRIEF DESCRIPTION OF THE DRAWINGS

In order that the present invention may be more readily understood an embodiment will now be described by way of example and with reference to the accompanying drawings, in which.

DETAILED DESCRIPTION OF THE PREFERRED EMBODIMENTS

Figure 1:
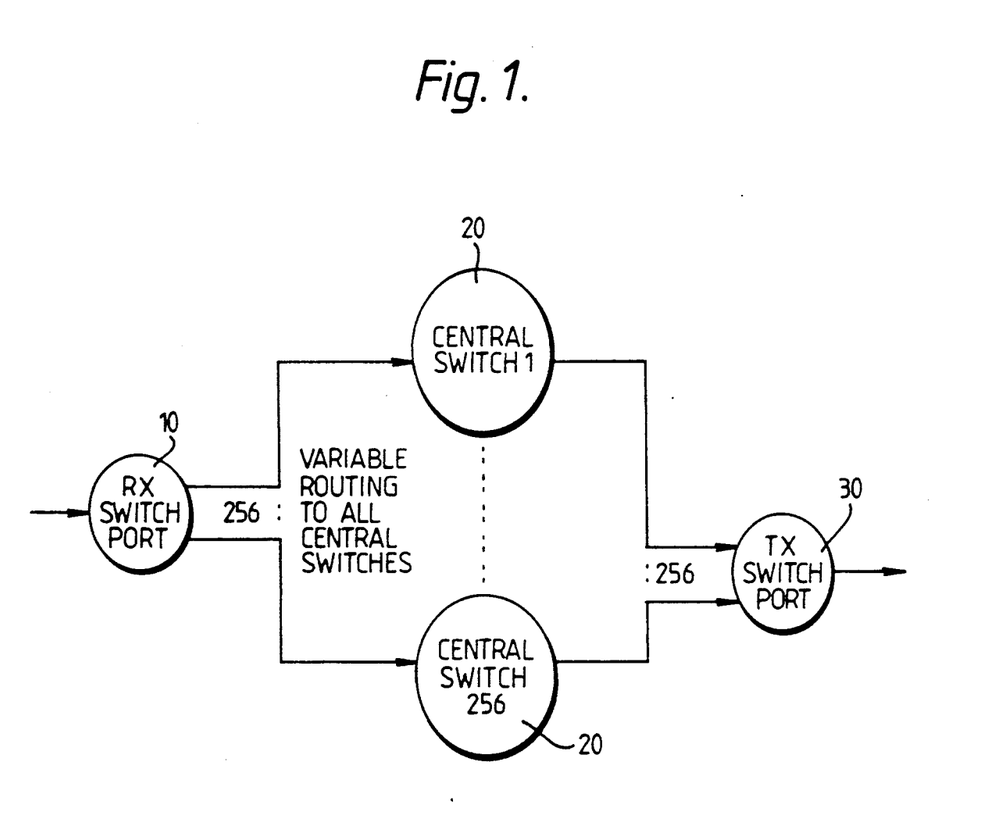
FIG. 1 is a schematic diagram of a general embodiment of a switch according to the present invention.

Referring now to FIG. 1 of the drawings this shows a single input port and associated switch 10 of an ATM switch constructed in accordance with the present invention. The port 10 is connectable to a set of central switches 20 in turn connectable to an output port 30. The input port is part of a set of similar input ports. Each input port receives a data stream which consists of a sequence of multi-byte cells, each cell having a header from which the destination of the cell can be derived. The cells are typically 48 octets of information plus 5 octets of header. When a cell and its header is received by an input port the switch associated with that port distributes elements of the cells sequentially over a number of outputs. Each output of each input port 10 is connected to a DMR circuit. These circuits are not shown in this figure.

Basically DMR stands for Demultiplex-Mix-Remultiplex and a DMR circuit is a fixed space switching device which has N inputs, N time intervals and N outputs and operates cyclically so that each input goes to each output for 1/Nth of the time. As the DMR stages have a simple space switching function for serial streams they do not add any delay to the switching time.

Each of the input DMR circuit in turn has its N outputs connected to an equivalent number of different central switches 20 which forms the central stage of the ATM switch. Each central switch has the same number of inputs as each outer switch and DMR circuit has outputs. It also has the same number of outputs each of which is connected to a DMR circuit similar to the input DMR circuits. In fact the complete ATM switch is effectively symmetrical about the central stage 20 as the output DMR circuits are each in turn connected to N output switches and associated ports.

In the format being described there are equal numbers of input switches, input DMR circuits, central switches, output DMR circuits and output switches. Thus in a symmetrical ATM of the kind being described there will be X input switches, X central switches, 2X DMR circuits and X output switches with X being an integer multiple of N.

The result of this symmetrical arrangement is that each input port 10 has access to all of the central switches 20 for a period or window depending on the internal parameters of the complete ATM switch. Furthermore for any cell arriving at an input port and subsequently disassembled into the cell elements there are a possible X routes across the switch to its intended output port.

In the present embodiment there are 256 input ports and 256 output ports with N=16. The incoming data streams are at 155M-bits per second and the internal circuitry of the switch such that the DMR stages and central switches run at a logical rate of 40M bits per second. In the described embodiment this is achieved by two parallel 20 megabits per second streams. As the DMR stages have a 16 unit cycle this gives an internal frame cycle of 16 so that over every 16 internal frame cycles each of the 256 input ports 10 is connected to each of the 256 central switches for a period sufficient for it to pass a single data element of an incoming data stream. For example each data element can consist of 5 bytes of data plus control data.

The central switches 20 each have 16 outputs which are connected to 16 individual DMR output circuits. These output DMR circuits are identical in structure and operation to the input DMR circuits and each DMR output circuit is connected to 16 output ports 30. Thus any cell in any data stream input at an input port has a possibility of 256 routes to its possible destination. Also there are no problems of sequencing the data elements as they will always arrive at the output side of the switch in the same order as they arrived at the input side.

This sequencing is one result of the constant central stage delay for a data element transmitted across the switch and is an important factor.

Figure 2:
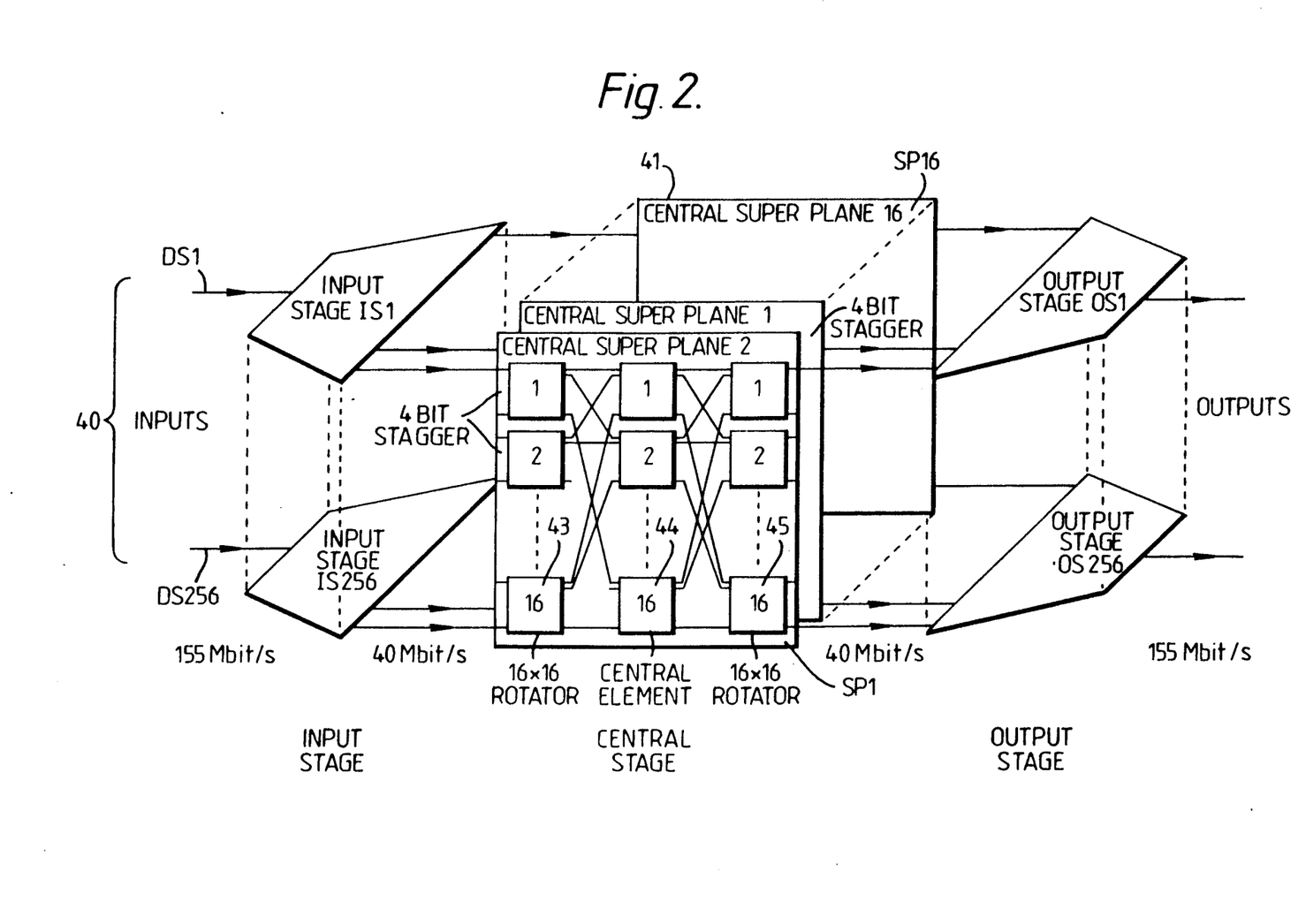
FIG. 2 is a block diagram showing a very simplified ATM switch according to the present invention.

The embodiment shown in FIG. 2 is a more detailed view of an ATM switch of the kind shown in FIG. 1.

In FIG. 2 the input data streams are shown at 40 and as already described there are 256 streams of which two, DS1 and DS256 are shown. Each stream is supplied to an appropriate input stage IS1 to IS256. From these stages the data streams are fanned out to a central stage 41. The central stage comprises 16 Central Super planes SP1 . . . SP16 of which three are shown. All the central stage super planes operate in the same fashion. At the input parts of the input stages each incoming data cell is divided into 11 sub cells or cell elements each containing 40 bits of information plus a four bit identifier. Since only 53 octets are required for an individual cell there are two spare octets which can be used for internal checking information. To permit the passing of flow control information between stages 20 bits of data is added to the 44 bit cell elements making a total length of 64 bits for each packet.

The reception of the data streams and their disassembly into cell elements will be described in greater detail hereinafter.

As can be seen from FIG. 2 each Input Stage IS1 . . . IS256 is connected to each of the central super planes SP1 . . . SP16 so that each super plane itself receives 256 inputs. These inputs are distributed over a first array of 16-by-16 rotator or DMR circuits 43 with each DMR circuit 43 being connected to one of 16 central elements 44. The central elements 44 in turn each give one output to an individual one of 16 output or DMR circuits 45. The output DMR circuits 44 each give one of their 16 inputs to one of 256 output stages OS1 . . . OS256. As can be seen from FIG. 2 the incoming and outgoing data streams are at 155 Mbit/s and the internal connections run at a logical rate of 40 Mbit/s.

Figure 3:
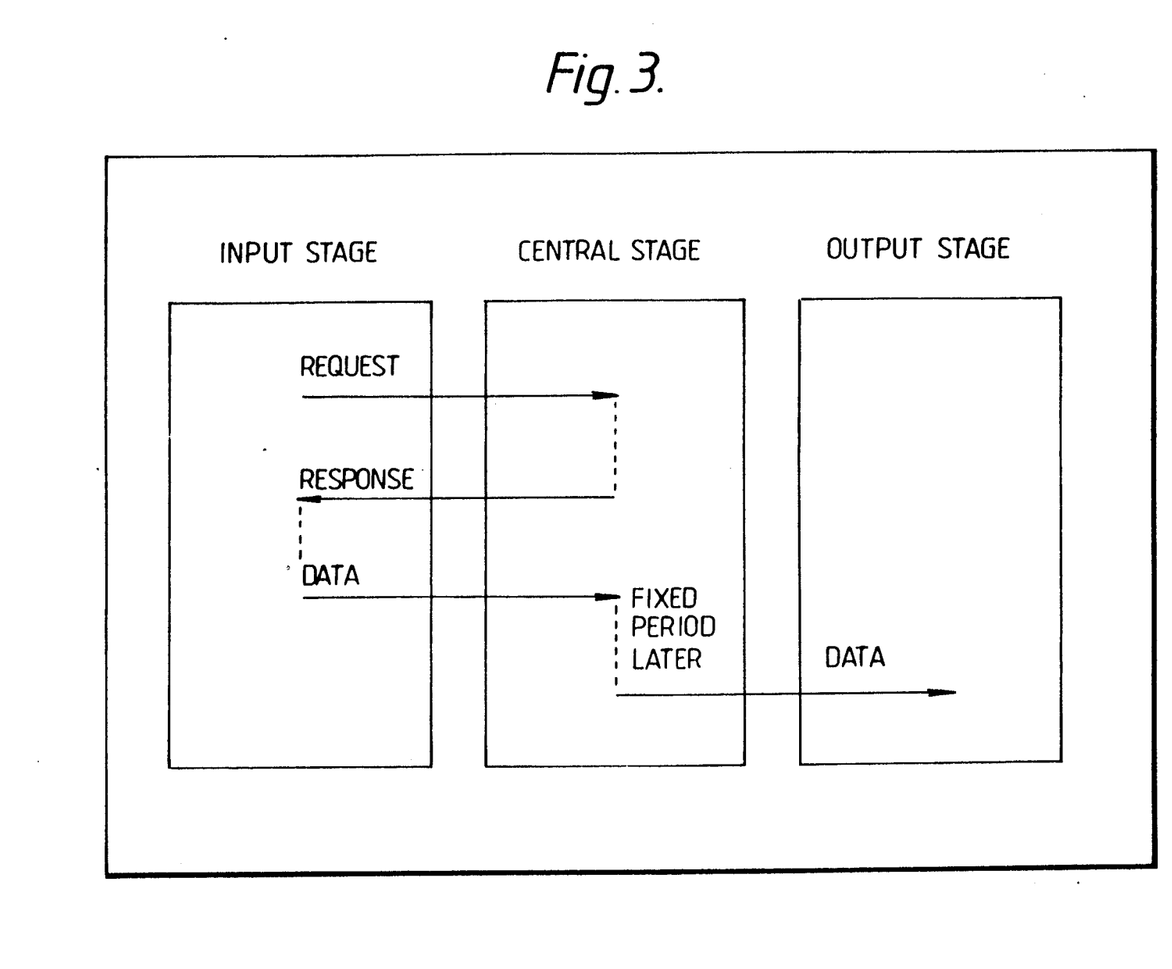
FIG. 3 is a diagram showing a sequence of flow control and data transfer in the switch of FIG. 2.

Referring now to FIG. 3 of the drawings this summarises the sequence of flow control and data transfer between the three stages of the ATM switch described in FIG. 2. For each cell element, a request is made to a central switch. If this responds positively, the data is sent. Some time later the data is sent on to the output stage. If the response is negative, then the input stage will try another central stage.

From the foregoing it will be appreciated that the cell elements form a particular cell which will arrive at the outer stage of the switch in their correct sequence. However there will be no specific pattern as to the element receivers at which they are received nor in relation to cells from any other input port.

From the preceding description of the input, central switch and output stages it might also appear that cell sequence integrity would be lost when different central stage elements are used to transfer the cells on one virtual circuit. This is prevented by rotating the input and output central stage access times in step so that for any cell input into the switch there is a constant storage delay in the central stage. Different input to output port connection combinations will have different fixed delays across the routing function over the range of zero to the full central stage access time.

Figure 4:
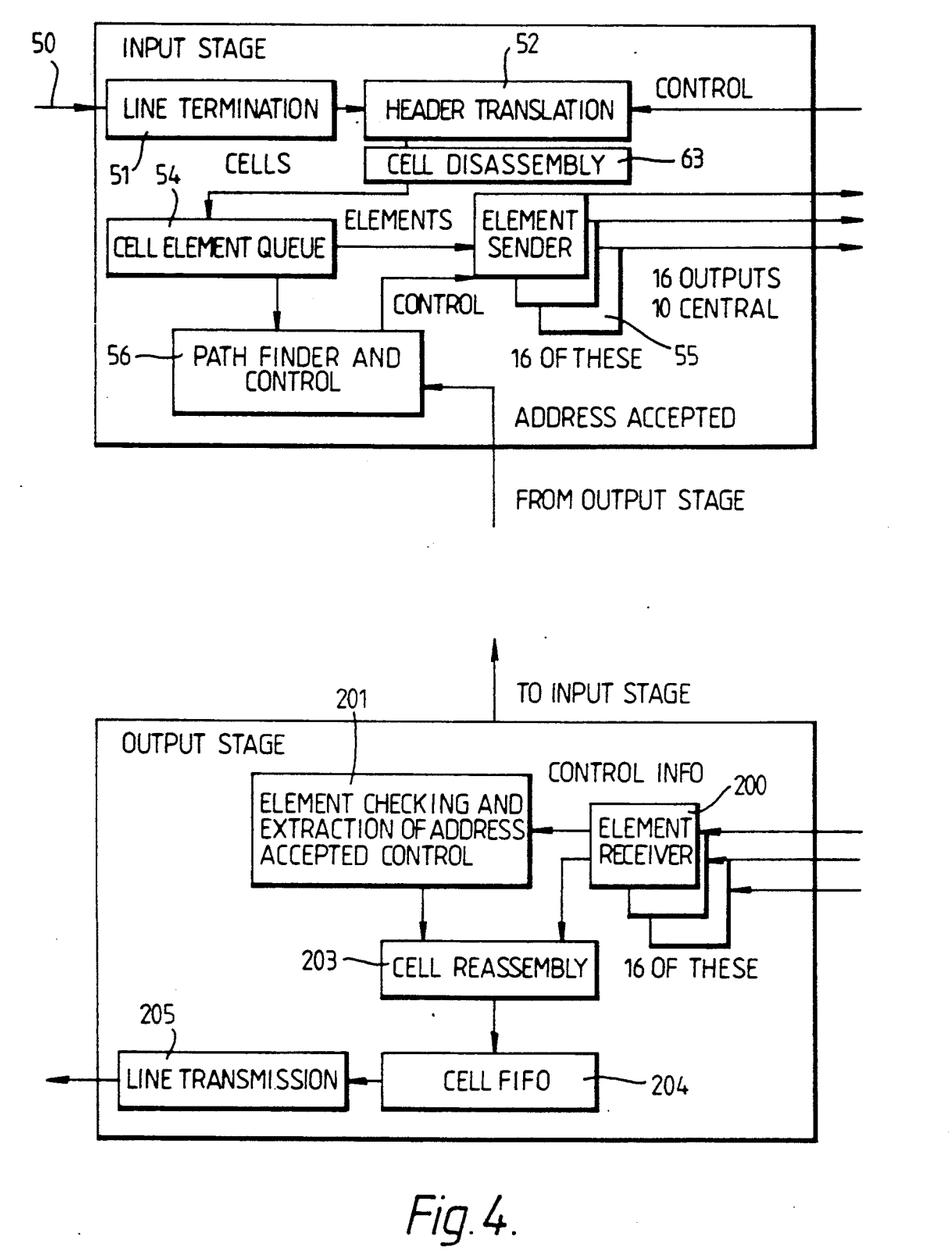
FIG. 4 is a block diagram of the receive and transmit outer stages of the switch.

FIG. 4 of the drawings shows an individual input stage. An input data stream consisting of sequential data cells as defined each having an associated header is received at 50 with a suitable line termination 51. The received signal is passed to a header translation circuit 52 which under the control of a suitable processor translates the cell headers so that their destinations can be determined.

The header translation circuit takes the cell header and derives in a known manner, for example by appropriate look-up tables, the routing information for the cell. The header translation circuit 52 also generates the new header for onward transmission in the network. The output from the header translation circuit 52 is supplied to a cell disassembly circuit 63 which divides the 53 octets originally received into 11 data elements each of 5 octets, there thus being 2 octets spare, as already described. This division is carried out in such a manner that each data element contains a portion of the original cell and information which enables the data elements to be reassembled as a cell after transmission across the switch. As soon as the header has been translated the transfer of the cell elements, and thus the cell, across the switch can be started before the entire cell has been received at the line termination.

As already mentioned each cell element has a multiplicity of potential routes available to it across the switch. However when the switch is actually handling a load some of the routes will inevitably be occupied by cell elements of data from other input stages. In order to be able to determine a route through the switch the data elements generated by the cell disassembly circuit 63 are sent to a data or cell element queue 54. This element queue 54 stores in parallel successive cell elements and is connected to 16 parallel element sender circuits 55. The element senders 55 operate in parallel and each has an operational cycle of 64 bits. The operational cycles are staggered in 4 bit steps as will be described hereinafter.

The element senders 55 operate under the control of a path finder control circuit 56 which examines the routing information carried by each cell element and sends requests to the central switch for a number of data elements stored in each cell element queue. In this embodiment the number in two and because of the previous "fanning out" of the incoming data streams any two adjacent cell elements in a cell element queue will almost certainly be from different data cells. It will be appreciated that the data elements of a single cell will be sequential but there is no specific order for cell elements for different destinations.

Figure 5:
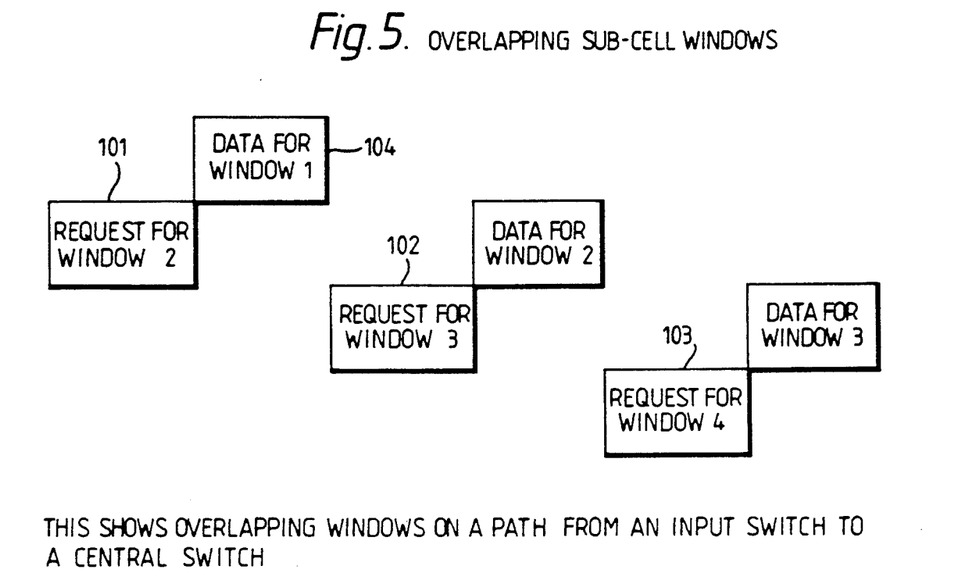
FIG. 5 is a timing diagram showing timing sequences in the operation of the ATM switch.
Figure 6:
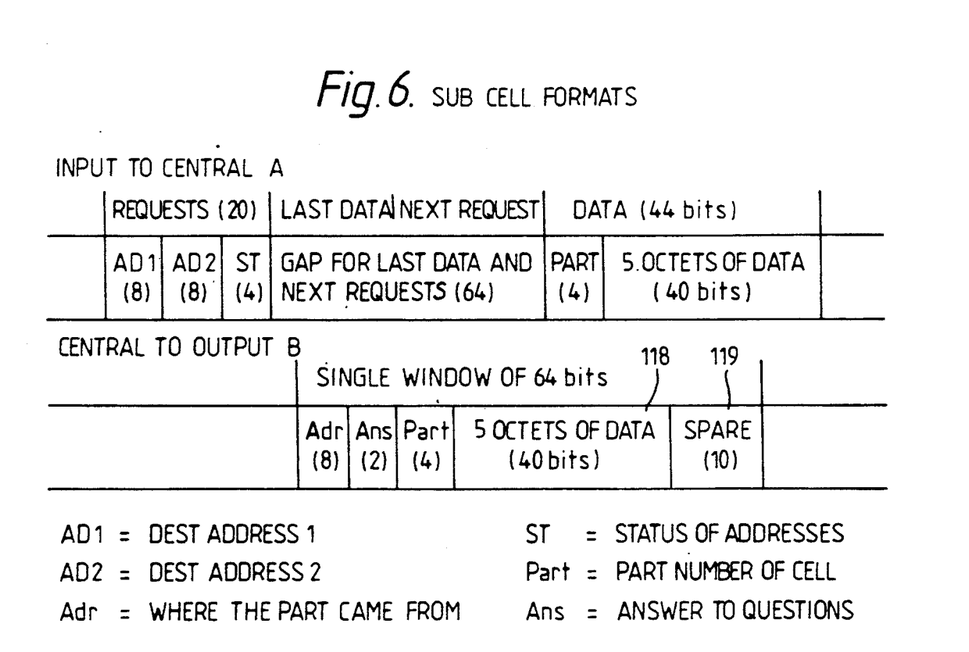
FIG. 6 is a timing diagram showing how routing data within the switch can be derived.

The operation of the path finder control circuit can best be appreciated by referring to FIGS. 5 and 6. FIG. 5 shows the basic concept of the operation of the path finder control circuit.

Thus the path finder control circuit 56 sends a series of spaced requests to the central stage, each request being for a window for a cell element in the element queue. These requests are shown at 101, 102 and 103. 101 is for a request for a window which has been labelled 2. At 104 the path finder control circuit 56 sends the cell element for a previously requested and accepted address which has been labelled window 1 . . If it happens that the element queue no longer has the data it will send a no-data indication to the control stage. The requests 101, 102, 103 are split to provide time for data to be received from the central stage validating a previous request. Thus the sequence of request and response for a particular window is interleaved with similar sequences for other windows.

FIGS. 6A and B show requests in greater detail. In FIG. 5A the section headed "requests" contains two 8-bit addresses AD1, AD2 for window 2 shown in FIG. 5 plus some control information ST (4 bits). In the subsequent 64 bit gap the data for the previously requested window is sent and the request for window 3. This is followed by the port number and a cell element which will be sent to either address AD1 or AD2 in response to the data from the central stage received in the gap indicating availability of one of the requested addresses.

FIG. 6B shows the response of the central stage. Thus "ANS" is the answer to a request, "ADR" is where the part comes from, "part" is the part number of the cell element. The area marked 118 corresponds to the cell element originally formed by the cell disassembly circuit and area 111 contains 10 spare bits.

Associated with the input stages are an equal number of output stages. One such output stage is also shown in FIG. 4. Thus each output stage has 16 element receivers 200 each corresponding to one of the element senders of the input stages. Each element receiver is connected to a circuit 201 which checks the received elements, extracts their addresses and generates the relevant control information to re-assemble the cell element in a cell re-assembly circuit 203. The re-assembled cells are supplied first to a Cell FIFO circuit 204 and then to a line transmission circuit 205 for onward transmission.

Figure 7:
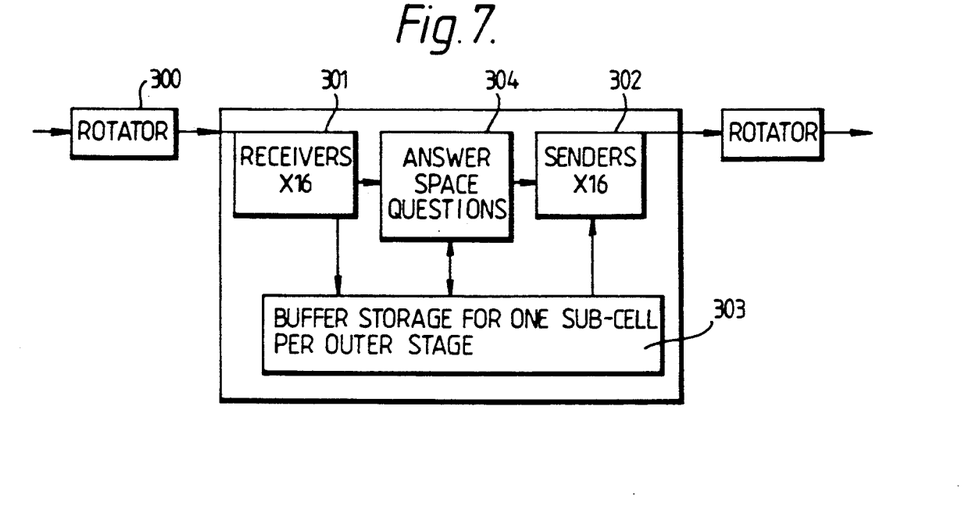
FIG. 7 is a block diagram of a central stage.

The center stage through which the cell elements are sorted is shown in FIG. 7. This center stage comprises an input DMR circuit 300 and 16 receiver circuits 301, 16 sender circuits 302, a buffer 303 for storing one sub cell or cell element per outer stage, a circuit 304 for answering space questions sent by the input stages and an output DMR circuit 305.

In the switch structure just described it would be possible to operate all the super planes in phase with one another. However this would require an input queue to be able to simultaneously launch flow control interrogation messages to all 16 super planes. Staggering the timing progressively by 4 bit periods at the logical rate of 40 Mbit/s between the super planes evens out the operation. Within the super planes a similar timing clash could occur at the central elements. This is avoided by having a 4 bit stagger in timing between the DMR circuits. Each DMR device has alignment on its 16 inputs and outputs. Because the central elements each terminate one line from each DMR, they will have a 4 bit stagger on the inputs. There will be a mirror imaging reflection of this staggering in the DMR's on the output side.

Figure 8:
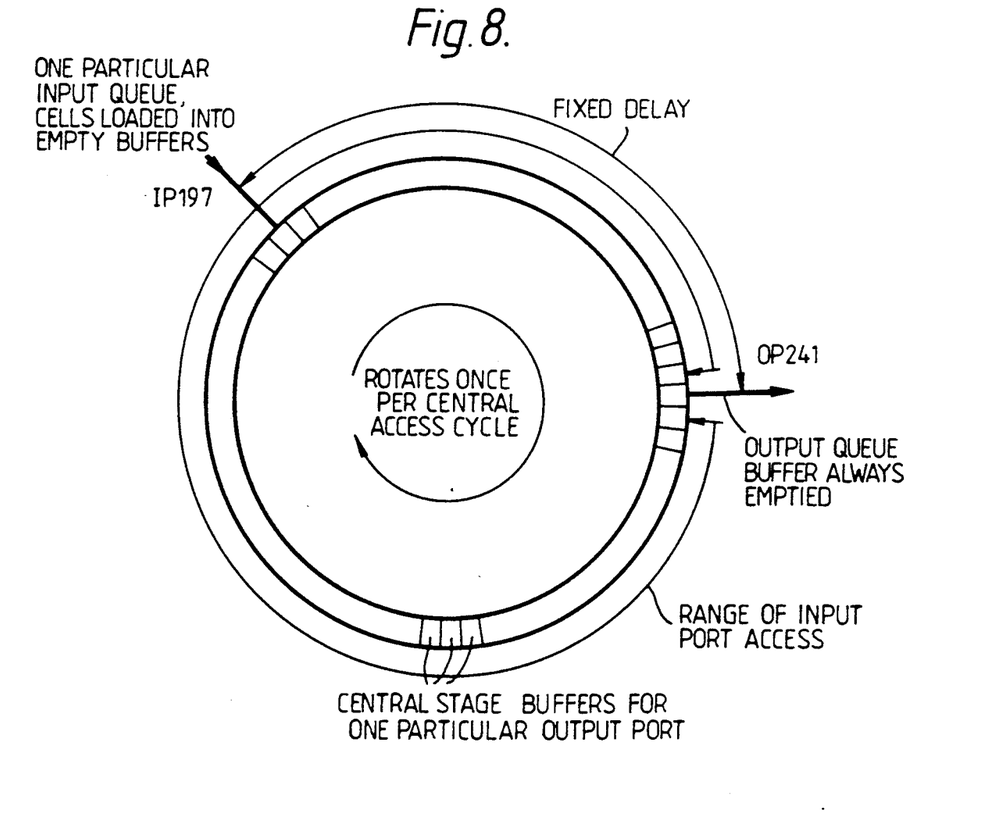
FIG. 8 is a figure illustrating the operation of the central stage cyclic timing operation.

The timing principles of the central stage buffering are shown in FIG. 8 which is not a physical representation but rather a logical one. FIG. 8 can be interpreted in the following way:

For one output port for example OP 241 its designated storage in the central stages appears like a large rotating buffer constantly feeding it cell elements. When a cell element arrives at an input port, for example IP 197, it will be fitted into the next central buffer space available as the notional wheel rotates. When the buffer goes past the output, the cell is taken out and it joins the ouput queue for that port. The central buffers rotate faster than necessary, so that peaks in capacity get routed across to the output keeping the input queues small. The central stage buffering for a particular output port is referred to as a "water wheel" model. It is simple to see why a cell takes a fixed time to go from an input to an output, as the "wheel" rotates.

Figure 9:
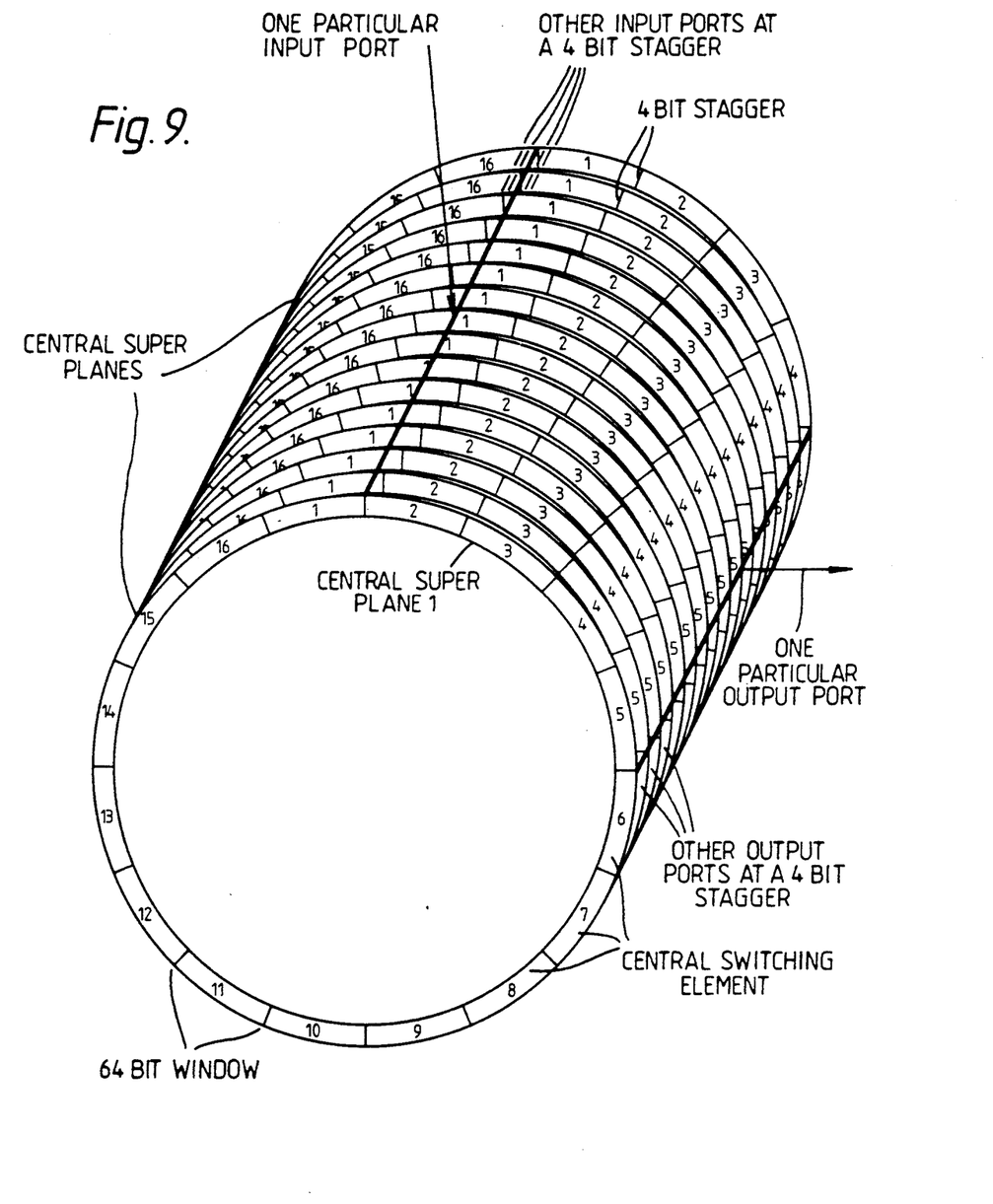
FIG. 9 is an elaboration of FIG. 7

FIG. 8 attempts to illustrate the complete central stage cyclic timing operation on a "turbine" model diagram. Each layer of the "turbine" represents the access to the central elements on a super plane, which may be considered as a mini "water wheel" in its own right, as shown in FIG. 9. Successive layers show the 4 bit stagger by a small rotation of the "water wheels".

Referring again to FIG. 4, it has already been described that when a cell is received the header is translated and then dis-assembled cell elements placed in an input queue. Every 4 clock cycles or 0.1 microseconds a 64 bit communication window with a central switch element will start. The as discussed controller sends up to two addresses and some status information to a central stage element, in the 20 bit control field. The addresses indicate to the controller in the central elements the output port destinations for which there are subcells queued transfer. The, central stage as shown in FIG. 7, will indicate which of the requested addresses it has space for. The output port buffer will be automatically reserved as part of the process of returning a positive acknowledgement to the input controller. When a positive response is received by the input stage, it sends the next sub-cell queued for the requested address, along with information identifying which part of the cell it is. When the sub-cell reaches the central stage it is stored until it can be transferred to the appropriate output stage. At this point the central element controller will be able to release the output port buffer for further use.

To allow for the real delays in passing information from one stage to the next and to permit suitable processing to be performed, the input stage requests have to be sent in advance of sending the sub-cell data. In order to avoid wasting inter-stage data transfer capacity, the request information is sent one window period in advance as shown in FIGS. 5 and 6. This results in the 64 bit response time for sending data. However, the input stage controller is able to operate on a shorter turn round time for determining requests to other central stage elements, because the response is returned within about 16 bit periods.

As there is no need for flow control messages from the central stage to the output stage, there is spare bandwidth available which is used for returning the responses to the input stage request messages. This requires an association to be established between input and output stage elements, which naturally occurs on a switch handling duplex connections.

In principle an input stage could have cells queued for many output ports And ideally would need to send more than two addresses to the central elements. Sending more addresses would occupy more of the bandwith available for transfer to the central stages and can reduce the overall efficiency of the system. Simulation modelling has shown that two addresses per transfer window gives the best overall performance. With fully random traffic at moderate loads one address would give a marginal improvement, but performs badly with some forms of bursty traffic.

The design just described has a number of advantages over prior proposals. The disassembly of the incoming data cells into cell elements allows minimal delay variation and all loss, and in fact delay variation approaches the ideal. The switch operates as a theoretically ideal switch but with a small added delay which is nevertheless fixed. Additionally the switch does not require internal pre-assigned routing of cells.

The only real delay variability experienced by this switch, as described, is that inherent in usng ATM as a multiplex structure. Furthermore the delay performance of this switch is very good when compared with many other designs. Although they often have less delay at low loads; at high loads, their internal queuing between switch stages results in greater delays.

Cell losses are only encountered when the output queue overflows, this queue can be dimensioned to meet the required performance for delay and loss characteristics. Although it is technically possible for losses to occur at the input queue, these are extremely unlikely.

Perhaps the greatest merit of the switch is its operation during overload of an output port. Traffic destined for other output ports which are not overloaded can still get carried through the switch with minimal impact on delay.

The synchronous internal operation makes maintenance of the switch easy, since it removes uncertainty in the time domain.

The delay variation and cell loss caused by the design approaches the theoretical minimum. In this respect, the sysnchronous ATM switch behaves as a single stage switch.

We claims:

1. An Asynchronous Transfer Mode Switch having a plurality of input stages each for receiving a digital data transmission stream consisting of a series of cells, a cell comprising data and a header containing control data from which the destination of the cell can be determined, a plurality of central stages connected to the input stages to receive the data from the input stages to be switched across the switch, each central stage including a central switch, and a plurality of output stages each connected to the central stages, and wherein for every input stage there is a route to every central stage for the transmission of data, and from every central stage there is a route to every output stage, and wherein each input stage includes a circuit for determining the destination of the cells of that data stream, a circuit for disassembling each cell into cell elements and for allocating to each cell element routing data to enable it to be routed across the central stages, means for storing the cell elements sequentially, means for requesting from a central stage, in response to receipt of a cell within the input stage, permission to transmit a cell element in the series and after a predetermined delay a further request for the same destination point provided that the stored cell elements are derived from the same cell, means for receiving a response output from the central stage in response to the request as to the availability of the requested destination between the sending of requests so that the sequence of sending a request of one cell element is interleaved with the response to the request for the preceding cell element, and means for transmitting each cell element to the central stage after a second predetermined delay from the receipt of a positive response therefrom.

2. A switch as claimed in claim 1 and further comprising a plurality of element queues operative to store therein successive cell elements, each element queue being connected to a plurality of parallel element sender circuits, the element sender circuits operating under the control of a pathfinder control circuit which examines the routing information carried by each cell element and sends requests to the central switch for a number of data elements stored in each cell element queue.

3. A switch as claimed in claim 2 wherein each pathfinder control circuit sends a series of spaced requests to the central stage, each request being for a window for a cell element in the element queue.

4. A switch as claimed in claim 3 in which to maintain cell sequence integrity across the switch the input and output central stage accesses are rotated in steps so that for any cell input to the switch there is a constant storage delay in the central stage.

* * * * *